Benjamin G. Fox — Impd. Hay Fork.

118121

PATENTED AUG 15 1871

WITNESSES

UNITED STATES PATENT OFFICE.

BENJAMIN G. FOX, OF PRICETOWN, PENNSYLVANIA.

IMPROVEMENT IN FORKS FOR HAY-ELEVATORS.

Specification forming part of Letters Patent No. 118,121, dated August 15, 1871.

*To all whom it may concern:*

Be it known that I, BENJAMIN G. FOX, of Pricetown, county of Berks, State of Pennsylvania, have invented an Improved Fork for Hay-Elevators, of which the following is a specification:

My invention consists of a fork for hay-elevators, too fully described hereafter to need preliminary explanation, and possessing the advantages of lightness and simplicity of construction and effectiveness of operation.

Figure 1:
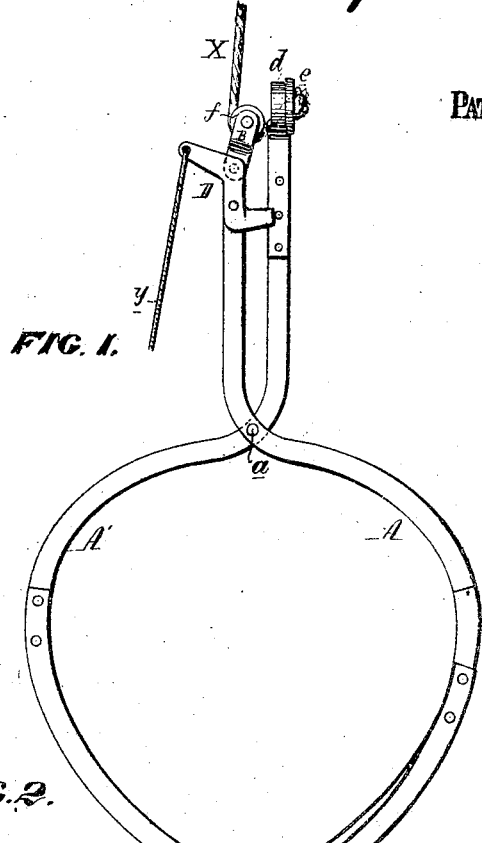
Figure 2:
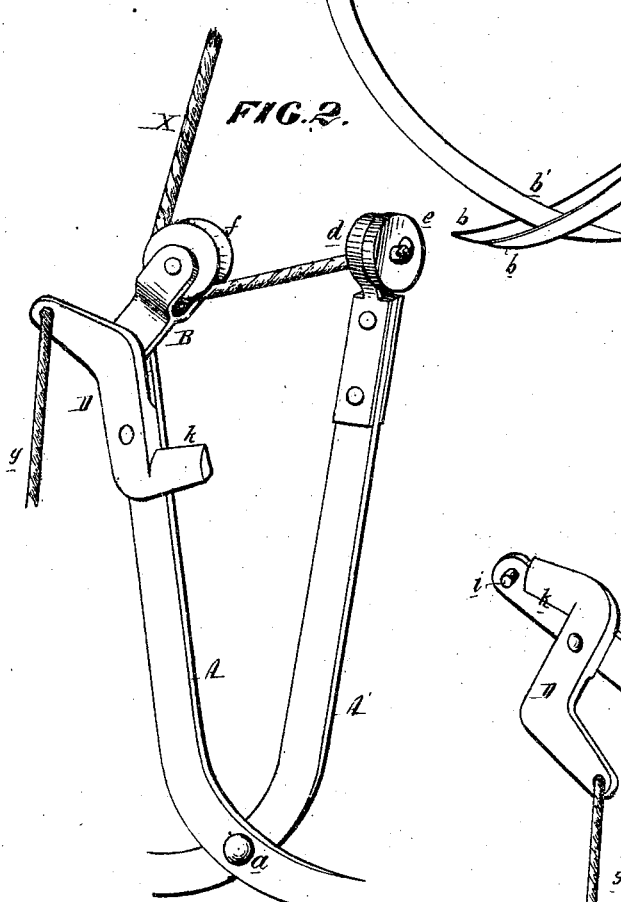

Figure 1 is a side view of my improved fork for hay-elevators; Fig. 2, an enlarged perspective view of the upper portion of the same as it appears when the jaws are closed; and Fig. 3, the same as Fig. 2, showing the position of the parts when the jaws are thrown open to discharge a load.

A and A' represent the two bars of which the fork of the elevator is composed, the said bars being crossed and joined together at the point $a$ and bent at their lower ends, as plainly shown in Fig. 1, so as to form jaws for embracing and holding a mass of hay, the jaw formed by the bar A terminating in two tines, $b\,b$, between which passes the single tine $b'$, with which the jaw A' is provided. The upper ends of the bars A and A' above the joint $a$ are, when the jaws are closed, parallel, or nearly so, and at the top of the bar A' is an eye, $d$, through which is passed the draft-rope X, the end of the latter being knotted or provided with a button, $e$, to prevent it from being drawn through the said eye. The rope is also passed under a pulley, $f$, hung to one end of a link, B, the latter having at its upper end a hole, $h$, adapted to a short pin, $i$, at the upper end of the bar A.

The link, when thus attached to the bar A, is prevented from being disengaged from the same by a lever, D, hung to the bar beneath the pin $i$, and arranged to cover the latter and the end of the link, as shown in Figs. 1 and 2.

When the bars are thus connected by the rope X and link B the jaws will be drawn closely together, so as to retain a mass of hay until the elevator has been raised to the required height.

Figure 3:
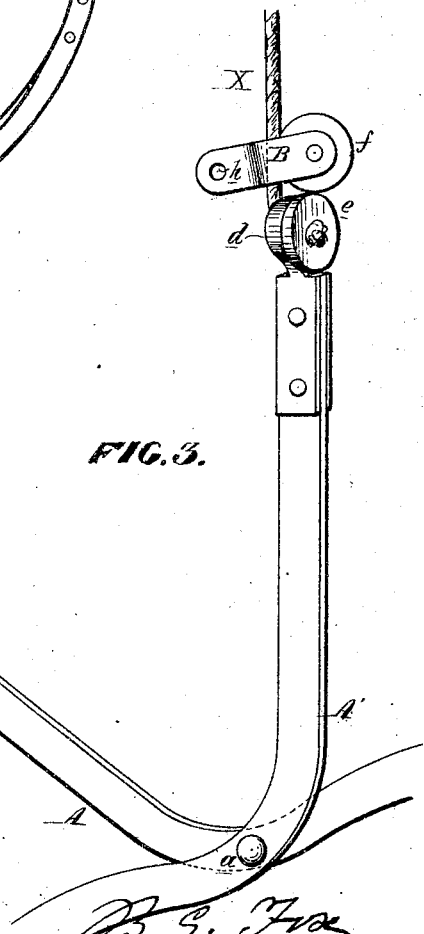

When it is desired to open the jaws and discharge the load the bent lever D is turned upon its fulcrum by means of a cord, $y$, so as to uncover the pin $i$ and link B, the motion of the lever being continued until a wedge-like projection, $k$, with which it is provided, is inserted between the link and bar A, so as to push the former off of the pin $i$, and thus disconnect the bars and permit the jaws to open, as shown in Fig. 3. To facilitate this operation the edges of the link B should be beveled, so as to permit the ready introduction between the same and the bar of the wedge $k$.

It will be evident, without further description, that my improved fork for hay-elevators, while possessing the advantages of lightness and economical construction, will be also effective in operation.

I claim—

The combination of the retaining and releasing-lever D, hung to one of the jaws or bars of a fork for a hay-elevator, with a link, B, adapted to a pin, $i$, on the same bar, and attached to a rope, X, connected to the opposite bar, all substantially as specified.

In testimony whereof I have signed my name to this specification in the presence of two subscribing witnesses.

BENJAMIN G. FOX.

Witnesses:
   WASHINGTON RICHARDS,
   JAS. Y. LYON.